C. ADELHELM & R. KECK.
DRIVING GEAR FOR MOTOR VEHICLES.
APPLICATION FILED OCT. 2, 1909.

983,417.

Patented Feb. 7, 1911.

Witnesses
Geo. L. Thom
Edith L. Smith

Inventors
C. Adelhelm
R. Keck

By
Attorney

UNITED STATES PATENT OFFICE.

CHARLES ADELHELM AND ROBERT KECK, OF CHICAGO, ILLINOIS.

DRIVING-GEAR FOR MOTOR-VEHICLES.

983,417.

Specification of Letters Patent.

Patented Feb. 7, 1911.

Application filed October 2, 1909. Serial No. 520,667.

*To all whom it may concern:*

Be it known that we, CHARLES ADELHELM and ROBERT KECK, citizens of the United States, residing at Chicago, in the county of Cook and State of Illinois, have invented certain new and useful Improvements in Driving-Gears for Motor-Vehicles, of which the following is a specification.

This invention relates to driving gears for motor vehicles, and comprises especially a new and improved gear applicable to steering wheels especially those of the knuckle type, in which the wheel is connected to the axle by a knuckle at the end of the axle.

The object of the invention is to provide an improved device for transmitting power from the driving shaft to the axle, preserving the advantages incident to a steering wheel drive, as well as other advantages incident to a front wheel drive, such for instance as allowing the rear axle to be dropped so that the box of the wagon can be lowered as desired. The advantages of a front wheel drive need not be more particularly referred to, and as applied thereto the present invention embodies the use of a longitudinal driving shaft with improved gear connections therefrom to the wheel.

The invention is illustrated in the accompanying drawings in which—

Figure 1:
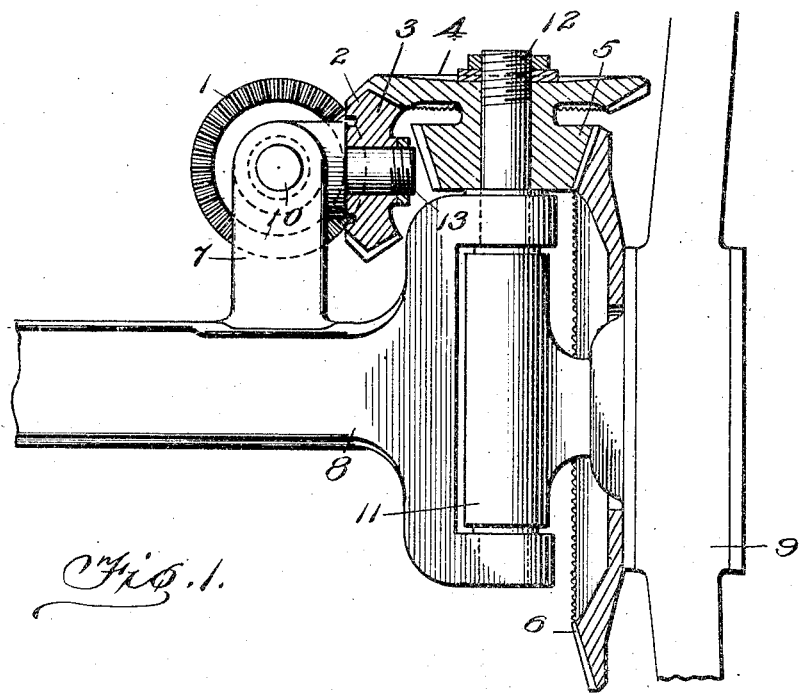
Figure 2:
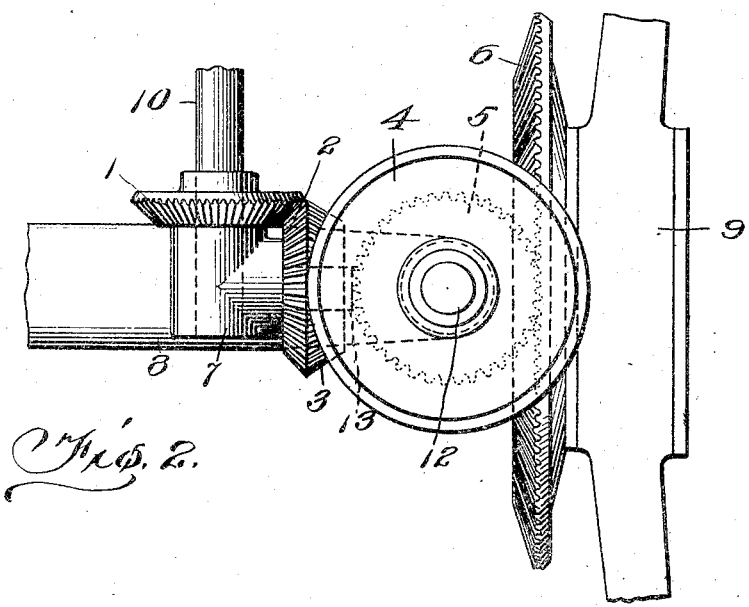

Figure 1 is a front elevation with parts in section showing the gearing. Fig. 2 is a top plan view.

Referring specifically to the drawings 8 indicates the end of the axle, with a knuckle joint at 11 supporting the stub axle on which the wheel 9 is mounted.

At 7 is a bracket fastened to the axle 8 and having a bearing extending lengthwise of the vehicle, or across the axle, for the driving shaft 10 to which power may be applied in any suitable manner and from any suitable source.

Fast upon the shaft 10 is a bevel gear 1 which meshes with a gear 2 formed in one piece that fastens to an opposite bevel gear 3. These gears 2 and 3 run loose on a stud 13 projecting from the outer side of the bracket 7. The bevel gear 3 meshes with a bevel gear 4 which turns on a stud 12 which is in line with or forms a continuation of the knuckle pin of the joint 11. Integral with or fastened to the gear 4 is another bevel gear 5, small enough to pass the stud 13, and this gear 5 meshes with a ring bevel gear 6 which is fastened to the wheel, the gears 4 and 5 turning freely on the stud 12. Suitable nuts or other devices are applied to hold the gears in place. When the shaft 10 is driven the power is communicated through the gears 1, 2, 3, 4, and 5 to the gear 6 and the wheel.

What we claim as new is:

The combination with an axle and a steering wheel, and a knuckle joint between the axle and wheel, of the driving shaft 10 extending perpendicularly to the axle, the gear 1 fast thereon, the bracket 7 fixed to the axle and having a bearing for said shaft 10 and also a stud 13 projecting parallel to the axle, the gears 2 and 3 loosely mounted on said stud, the gear 2 meshing with the gear 1, the gears 4 and 5 fastened together and loosely mounted coaxially with the pivot of the knuckle, the gear 4 meshing with the gear 3, and the gear 6 fastened to the wheel and meshing with the gear 5.

In testimony whereof, we affix our signatures in presence of two witnesses.

CHARLES ADELHELM.
ROBERT KECK.

Witnesses:
NELLIE FELTSKOG,
H. G. BATCHELOR.